(12) United States Patent
Harmon

(10) Patent No.: US 11,058,045 B2
(45) Date of Patent: Jul. 13, 2021

(54) SYSTEM AND METHOD FOR DETECTING ACCUMULATIONS OF FIELD MATERIALS BETWEEN GROUND ENGAGING COMPONENTS OF AN AGRICULTURAL IMPLEMENT

(71) Applicant: CNH Industrial America LLC, New Holland, PA (US)

(72) Inventor: Joshua David Harmon, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 124 days.

(21) Appl. No.: 16/173,098

(22) Filed: Oct. 29, 2018

(65) Prior Publication Data
US 2020/0128719 A1    Apr. 30, 2020

(51) Int. Cl.
| A01B 71/08 | (2006.01) |
| A01B 35/28 | (2006.01) |
| A01B 63/00 | (2006.01) |
| A01B 79/00 | (2006.01) |

(52) U.S. Cl.
CPC .............. *A01B 71/08* (2013.01); *A01B 35/28* (2013.01); *A01B 63/008* (2013.01); *A01B 79/005* (2013.01)

(58) Field of Classification Search
CPC ......... A01B 33/12; A01B 71/08; A01B 35/28; A01B 63/008; A01B 79/005
See application file for complete search history.

(56) References Cited

U.S. PATENT DOCUMENTS

| 7,354,341 B1 | 4/2008 | Smith et al. |
| 7,381,130 B2 | 6/2008 | Smith |
| 8,408,149 B2 | 4/2013 | Rylander |
| (Continued) | | |

FOREIGN PATENT DOCUMENTS

| WO | WO2009127066 | 10/2009 |
| WO | WO2018020310 | 2/2018 |

OTHER PUBLICATIONS

JohnDeere, "Secondary Tillage, Field Cultivators, Seedbed Finishers, Mulch Finishers, Disks, and Vertical Tillage," Aug. 30, 2018, 28 pages.

*Primary Examiner* — Tara Mayo-Pinnock
(74) *Attorney, Agent, or Firm* — Rebecca L. Henkel; Rickard K. DeMille

(57) ABSTRACT

In one aspect, a system for detecting accumulations of field materials between ground engaging components of an agricultural implement may include first and second ground engaging components configured to rotate relative to soil within a field as the implement is moved across the field. The first and second ground engaging components may be spaced apart from each other along an axial direction of the shaft. The system may also include a sensor configured to detect field materials within a detection zone defined directly between the first and second ground engaging components and above the axis of rotation in a vertical direction of the agricultural implement. Furthermore, the system may include a controller communicatively coupled to the sensor, with the controller configured to determine a parameter associated with an accumulation of the field materials between the first and second ground engaging components based on data received from the sensor.

19 Claims, 6 Drawing Sheets

(56) References Cited

U.S. PATENT DOCUMENTS

| | | |
|---|---|---|
| 9,271,439 B2 | 3/2016 | Bourgault et al. |
| 9,282,688 B2 | 3/2016 | Casper et al. |
| 9,485,900 B2 | 11/2016 | Connell et al. |
| 9,668,399 B2 | 6/2017 | Gates |
| 2011/0247843 A1* | 10/2011 | Whalen et al. ........ A01C 7/203 172/315 |
| 2012/0048159 A1* | 3/2012 | Adams et al. ......... A01C 7/203 111/163 |
| 2012/0048160 A1* | 3/2012 | Adams et al. ......... A01C 5/066 111/163 |
| 2015/0296701 A1* | 10/2015 | Anderson .............. A01B 79/00 172/2 |
| 2015/0305224 A1* | 10/2015 | Casper et al. ......... A01B 79/00 701/50 |
| 2016/0100517 A1 | 4/2016 | Bassett |
| 2016/0262300 A1* | 9/2016 | Gates .................. A01B 79/005 |
| 2017/0112043 A1 | 4/2017 | Nair et al. |
| 2018/0206393 A1 | 7/2018 | Stoller et al. |
| 2018/0210450 A1 | 7/2018 | Ferrari et al. |

\* cited by examiner

SYSTEM AND METHOD FOR DETECTING ACCUMULATIONS OF FIELD MATERIALS BETWEEN GROUND ENGAGING COMPONENTS OF AN AGRICULTURAL IMPLEMENT

FIELD OF THE INVENTION

The present disclosure generally relates to agricultural implements and, more particularly, to systems and methods for detecting accumulations of field materials between ground engaging components, such as between adjacent discs or other rolling components, of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging components configured to rotate relative to the soil as the implement is moved across the field. For example, in certain configurations, the implement may include one or more harrow discs, leveling discs, rolling baskets, and/or the like. Such rotating ground engaging component(s) loosen and/or otherwise agitate the soil to prepare the field for subsequent planting operations.

During tillage operations, field materials, such as residue, soil, rocks, and/or the like, may become trapped or otherwise accumulate between adjacent rotating ground engaging components. Such accumulations of field materials may inhibit the operation of the rotating ground engaging components in a manner that prevents the components from providing adequate tillage to the field. In such instances, it is necessary for the operator to take certain corrective actions to remove the accumulated field materials. However, it may be difficult for the tillage implement operator to determine when field materials have accumulated between the rotating ground engaging components.

Accordingly, an improved system and method for detecting accumulations of field materials between ground engaging components of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting accumulations of field materials between ground engaging components of an agricultural implement. The system may include first and second ground engaging components configured to rotate about an axis of rotation relative to soil within a field as the agricultural implement is moved across the field. The first and second ground engaging components may be spaced apart from each other along an axial direction corresponding to the axis of rotation. The system may also include a sensor configured to detect field materials within a detection zone defined directly between the first and second ground engaging components in the axial direction and above axis of rotation in a vertical direction of the agricultural implement. Furthermore, the system may include a controller communicatively coupled to the sensor, with the controller configured to determine a parameter associated with an accumulation of the field materials between the first and second ground engaging components based on data received from the sensor.

In another aspect, the present subject matter is directed to a tillage implement. The tillage implement may include a frame and a shaft coupled to the frame, with the shaft being positioned below the frame along a vertical direction of the tillage implement. The tillage implement may also include first and second ground engaging components configured to rotate relative to soil within a field as the tillage implement is moved across the field, with the first and second ground engaging components being coupled to the shaft and spaced apart from each other along an axial direction of the shaft. Furthermore, the system may include a sensor mounted on the frame and configured to detect field materials within a detection zone defined directly between the first and second ground engaging components in the axial direction and above the shaft in a vertical direction of the agricultural implement. Additionally, the system may include a controller communicatively coupled to the sensor, with the controller configured to determine a parameter associated with an accumulation of the field materials between the first and second ground engaging components based on data received from the sensor.

In a further aspect, the present subject matter is directed to a method for detecting accumulations of field materials between ground engaging components of an agricultural implement. The agricultural implement may include first and second ground engaging components configured to rotate about an axis of rotation relative to soil within a field as the agricultural implement is moved across the field. The first and second ground engaging components may be spaced apart from each other along an axial direction corresponding to the axis of rotation. The method may include receiving, with a computing device, data from a sensor configured to detect field materials within a detection zone defined directly between the first and second ground engaging components in the axial direction and above the axis of rotation in a vertical direction of the agricultural implement. The method may include determining, with the computing device, a parameter associated with an accumulation of the field materials between the first and second ground engaging components based on the received data. When the determined parameter exceeds or falls below a threshold value, the method may include initiating, with the computing device, a control action.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
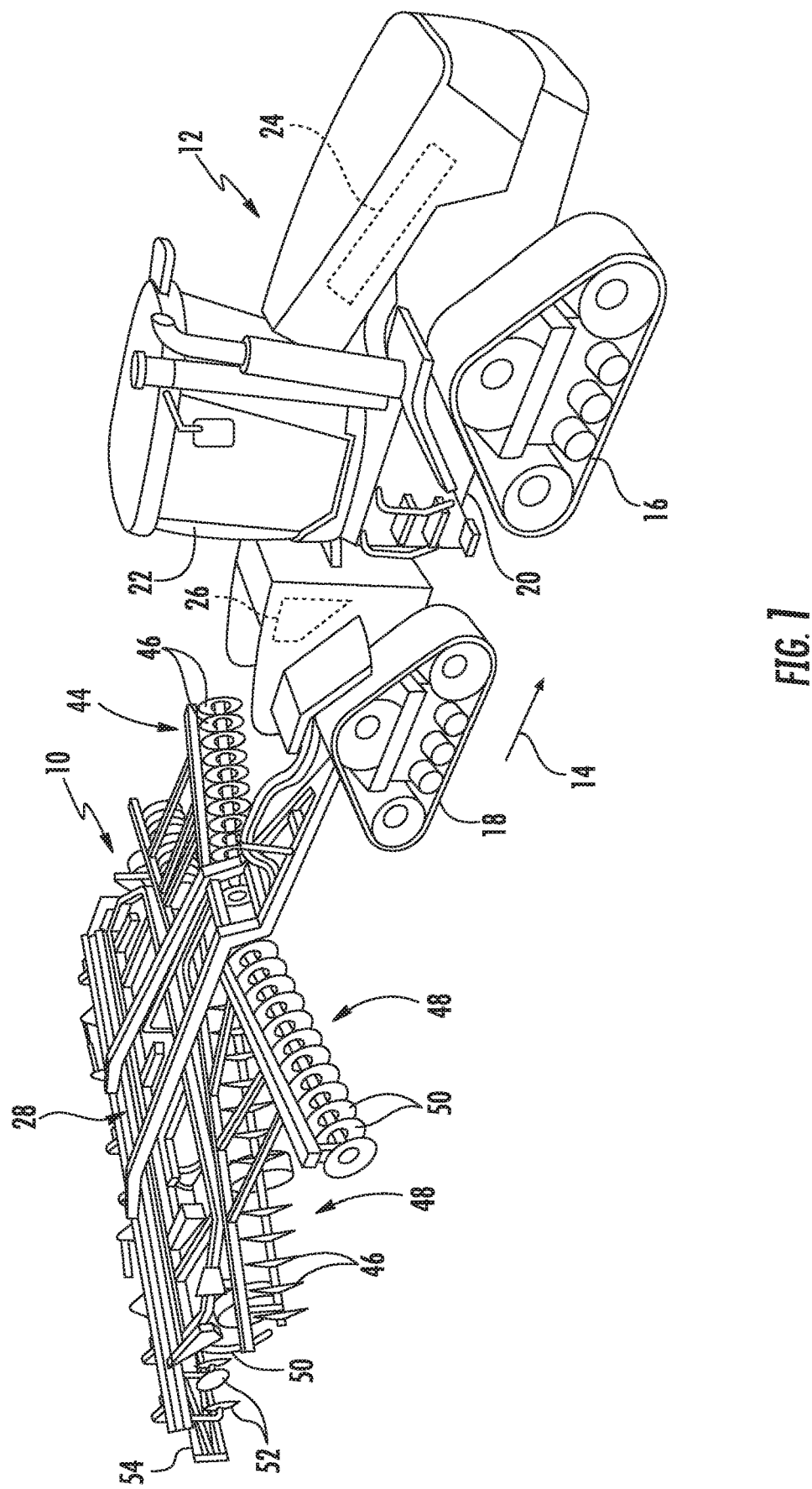
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting accumulations of field materials between ground engaging components of an agricultural implement. Specifically, in several embodiments, a controller of the disclosed system may be configured to receive data from one or more sensors as the implement is being moved across a field. Each sensor may, in turn, be configured to detect field materials (e.g., residue, soil, rocks, and/or the like) within an associated detection zone defined between a pair of rotating ground engaging components (e.g., discs) of the implement. For example, such rolling ground engaging components may be configured to rotate about an axis of rotation and spaced apart from each other along an axial direction corresponding to the axis of rotation. In accordance with aspects of the present subject matter, each detection zone may be defined directly between a pair of adjacent rolling ground engaging components in the axial direction and above the axis of rotation in a vertical direction of the implement. In this regard, the controller may be configured to determine a parameter associated with the accumulation of field materials between each pair of adjacent rolling ground engaging components based on data received from the associated sensor. For example, the determined parameter(s) may be the amount of the field materials detected within the associated detection zone, the frequency at which the field materials are detected within the associated detection zone, and/or the period of time across which the field materials are detected within the associated detection zone. Thereafter, in the event that the determined parameter(s) exceeds or falls below a threshold value, the controller may be configured to initiate one or more control actions. Such control action(s) may generally be associated with de-plugging or otherwise removing the field materials trapped or accumulated between the rolling ground engaging components. For example, in one embodiment, the control action(s) may include adjusting one or more operating parameters of the implement, such as the ground speed of the implement and/or the orientation of, the penetration depth of, and/or the down pressure being applied to the rotating ground engaging components.

Figure 2:
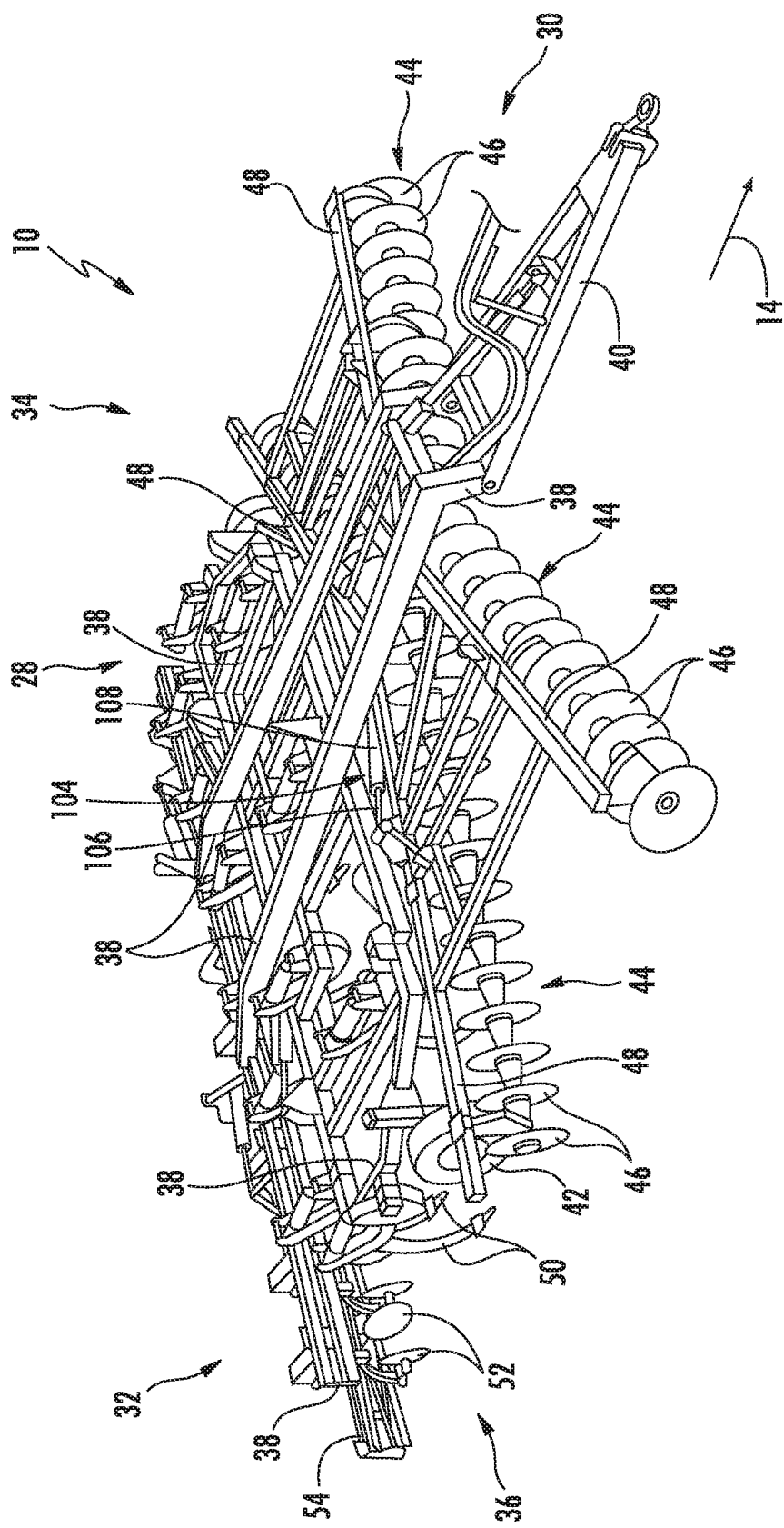
FIG. 2 illustrates an alternative perspective view of an agricultural implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102 shown in FIG. 6) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36, In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disc blades 46. Each disc blades 46 may, in turn, be configured to penetrate into or otherwise engage the soil as the implement 10 is being pulled through the field. In this regard, the various disc gangs 44 may be oriented at an angle relative to the direction of travel 14 to promote more effective tilling of the soil. In the embodiment shown in FIGS. 1 and 2, the implement 10 includes four disc gangs 44 supported on the frame 28 adjacent to its forward end 30. However, it should be appreciated that, in alternative embodiments, the implement 10 may include any other suitable number of disc gangs 44, such as more or fewer than four disc gangs 44. Furthermore, in one embodiment, the disc gangs 44 may be mounted to the frame 28 at any other suitable location, such as adjacent to its aft end 32.

Moreover, in several embodiments, the implement 10 may include a plurality of disc gang actuators 104 (one is shown), with each actuator 104 being configured to move or otherwise adjust the orientation or position of one of the disc gangs 44 relative to the implement frame 28. For example, as shown in the illustrated embodiment, a first end of each actuator 104 (e.g., a rod 106 of the actuator 104) may be coupled to a support arm 48 of the corresponding disc gang 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang 44 relative to a lateral centerline (not shown) of the frame 28 and/or the penetration depth of the associated disc blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support a plurality of leveling blades 52 and rolling (or crumbler) basket assemblies 54. However, in other embodiments, any other suitable ground-engaging tools may be coupled to and supported by the implement frame 28, such as a plurality closing discs.

Figure 3:
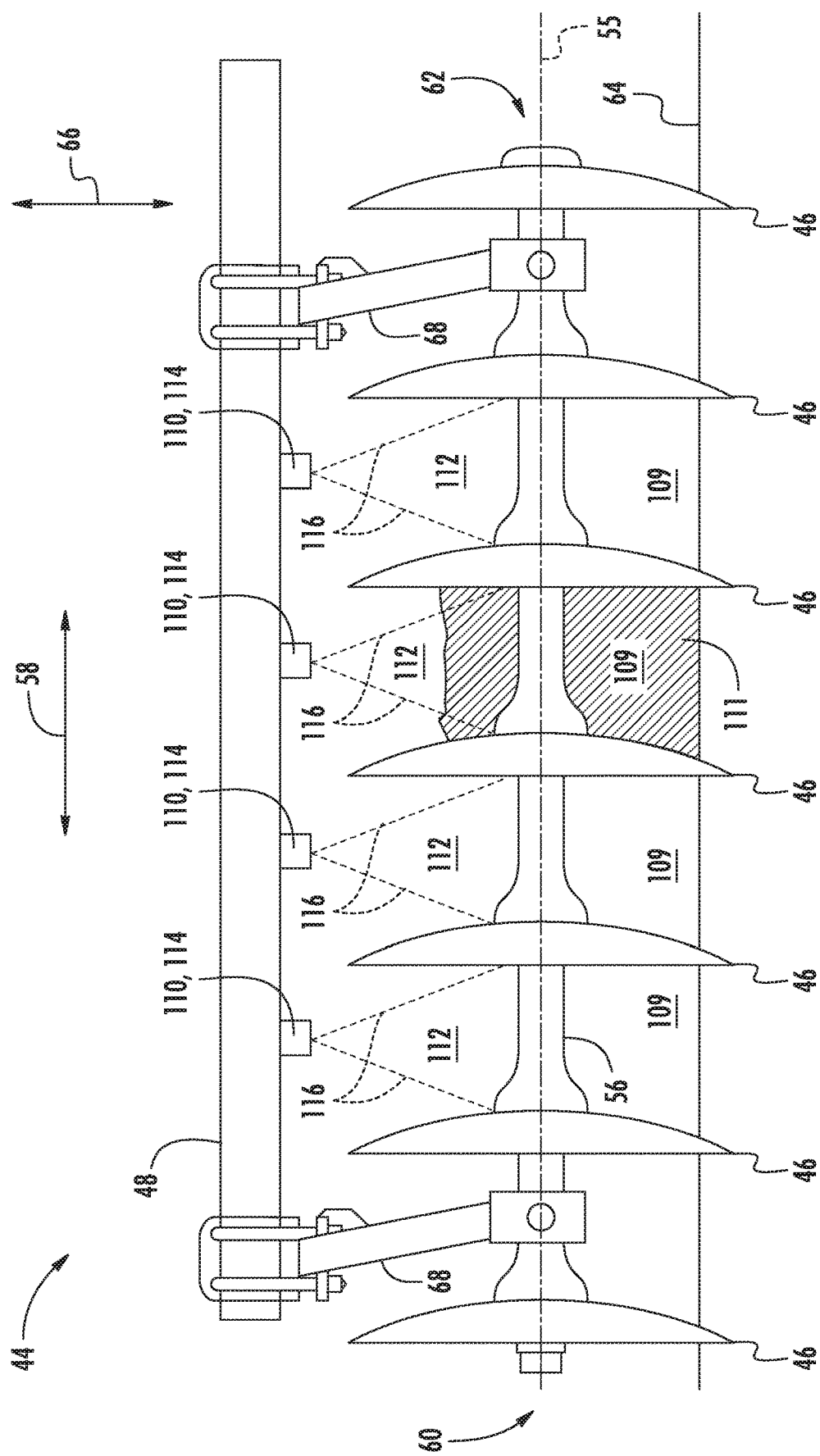
FIG. 3 illustrates a front view of one embodiment of a disc gang of an agricultural implement in accordance with aspects of the present subject matter, particularly illustrating a plurality of discs coupled to a shaft and a plurality of vision-based sensors configured to detect field materials within associated detection zones defined between adjacent discs of the disc gang.

Referring now to FIG. 3, a front view of one embodiment of a disc gang 44 of the implement 10 is illustrated in accordance with aspects of the present subject matter. Specifically, in several embodiments, the disc gang 44 may include a disc gang shaft 56 that extends along an axial direction of the disc gang 44 (e.g., as indicated by arrow 58 in FIG. 3) between a first end 60 and a second end 62. As shown, the disc blades 46 may be rotatable coupled to the disc gang shaft 56 and spaced apart from each other along the axial direction 58. As the implement 10 is moved across a field, the disc blades 46 may be configured to penetrate the soil surface e.g., as indicated by arrow 64 in FIG. 3) of the field and rotate about an axis of rotation (e.g., as indicated by dashed line 55 in FIG. 3) relative to the soil within the field. Furthermore, the disc gang shaft 56 may be positioned below the support arm 48 of the disc gang 44 along a vertical direction (e.g., as indicated by arrow 66 in FIG. 3) of the implement 10. As such, the disc gang 44 may include one or more hangers 68 configured to support the disc gang 56 relative to the support arm 48. However, in alternative embodiments, the disc gang 44 may have any other suitable configuration.

As shown in FIG. 3, the disc gang 44 may define one or more field material flow zones 109 through which field materials may flow during the operation of the implement 10. Specifically, in several embodiments, each flow zone 109 may be defined directly between a pair of adjacent disc blades 46 in the axial direction 58 and below the axis of rotation 55 in the vertical direction 66. For example, as shown in the illustrated embodiment, each flow zone 109 may be defined below the disc gang shaft 56. As the implement 10 is moved across the field, field materials (e.g., soil, residue, rocks, and/or the like) may flow through the flow zone(s) 109 as such field materials are being tilled or otherwise processed by the disc blades 46. It should be appreciated that during normal, non-plugged operation of the disc gang 44, substantially all of the field materials being processed by the disc gang 44 flow through the flow zone(s) 109 (i.e., below the axis of rotation 55), with only an occasional piece of residue, dirt clod, rock, and/or the like flowing above the disc gang shaft 56.

In certain instances, however, field materials may accumulate within the flow zone(s) 109 such that additional field materials flow above the axis of rotation 55, such as above the disc gang shaft 56. For example, when the soil in the field has high moisture content, the soil may stick or adhere to the disc blades 46 such that the soil accumulates with the associated flow zone(s) 109. Moreover, a large chunk of residue or a rock may become lodged between a pair of adjacent disc blades 46 in a manner that inhibits the flow of field materials through the associated flow zone(s) 109, thereby causing additional field materials to accumulate therein. When the accumulation of field materials between a pair of adjacent disc blades 46 is sufficient to inhibit the flow of further field materials through the associated flow zone 109, such further field materials may begin to flow above the axis of rotation 55 and the disc gang shaft 56. For instance, as shown in FIG. 3, the accumulation of field materials (e.g., as indicated by cross-hatched region 111 in FIG. 3) within one of the flow zones 109 is sufficient to cause the additional field materials 111 to flow through the disc gang 44 above the disc gang shaft 56.

In accordance with aspects of the present subject matter, one or more detection zones 112 may be defined above the axis of rotation 55 in the vertical direction 66. Specifically, in several embodiments, the detection zone(s) 112 may be defined above the disc gang shaft 56 in the vertical direction 66. Furthermore, each detection zone 112 may also be defined directly between a pair of adjacent disc blades 46 in the axial direction 58. As such, each detection zone 112 may be positioned directly above one of the flow zones 109 such that each detection zone 112 is aligned with a corresponding flow zone 109 along the axial direction 58. As indicated above, when a sufficient amount of field materials accumulate within one or more of the flow zones 109, further flow of field materials through the zone(s) 109 is inhibited. In such instances, the field materials may begin flowing over the disc gang shaft 56 and through the corresponding detection zone(s) 112, Although the illustrated embodiment includes four detection zones 112, the disc gang 44 may include any other suitable number of detection zones 112, such as more or less than four detection zones 112.

In several embodiments, one or more sensors 110 may be provided in operative association with the disc gang 44. As such, each sensor 110 may be configured to detect field materials within one or more associated detection zones 112. During normal, non-plugged operation of the disc gang 44, the sensor(s) 110 may detect only the occasional residue piece, dirt clod, rock, and/or the like within the detection zone(s) 112. When field materials begin accumulating within the flow zone(s) 109, only a portion such flow zone(s) 109 may be blocked. As such, some of incoming field materials may still flow through the flow zone(s) 109, while the remainder of the incoming field materials may flow through the corresponding detection zone(s) 112 as these field materials have no other way passing through the disc gang 44 (except for around its first and second ends 60, 62). In this regard, when field materials initially accumulate within the flow zone(s) 109, the frequency with which the sensor(s) 110 detect field materials within the corresponding detection zone(s) 112 may increase. Moreover, the duration of time over which the field materials are present within the detection zone(s) 112 may similarly increase. As more field materials accumulate within the flow zone(s) 109, such flow zone(s) 109 may eventually become entirely occluded. As such, all of the incoming field materials may begin flowing through the corresponding detection zone(s) 112, As such, the sensor(s) 110 may begin to detect a generally continuous flow of field materials within the associated detection zone(s) 112 when flow through the corresponding flow zone(s) 109 is completely blocked. In this regard, and as will be described below, the frequency at which the field materials are detected within the detection zone(s) 112, the period of time across which the field materials are detected within the detection zone(s) 112, and/or the amount of the field materials detected within the detection zone(s) 112 may be indicative of an accumulation of field materials within the corresponding flow zone(s) 109.

It should be appreciated that although the illustrated embodiment includes one sensor 110 associated with each detection zone 112, the disc gang 44 may include any other suitable number of sensors 110, such as more or less than four sensors 110. Furthermore, in alternative embodiments, each sensor 110 may be configured to detect field materials within two or more detection zones 112. Additionally, in a further embodiment, a plurality of sensors 110 may be configured to detect field materials within each detection zone 112. For example, in such embodiment, a first sensor 110 may be configured to detect field materials within a first half of the detection zone 112, while a second sensor 110 may be configured to detect field materials within a second half of the detection zone 112.

In several embodiments, the sensor(s) 110 may correspond to a vision-based sensor(s) 114. For example, in one embodiment, the vision-based sensor(s) 114 may be installed or otherwise positioned on the support arm 48 such that the sensor(s) 114 are positioned above the disc gang shaft 56 and the disc blades 46 in the vertical direction 66. As such, each vision-based sensor 114 may have a downwardly-directed field of view (e.g., as indicated by dashed lines 116 in FIG. 3) that at least partially corresponds to or overlaps with one of the detection zones 112. In this regard, each vision-based sensor 114 may be able to capture vision data (e.g., images, point cloud data, and/or the like) indicative of field materials present within and/or passing through the associated detection zone(s) 112. However, in alternative embodiments, the vision-based sensor(s) 114 may be positioned at any other suitable location(s) on and/or coupled to any other suitable component(s) of the implement 10, such as on the frame 28.

It should be appreciated that the vision-based sensor(s) 114 may generally correspond to any suitable sensing device(s). As such, in several embodiments, the vision-based sensor(s) 114 may correspond to a suitable camera(s) configured to capture three-dimensional images of the field materials within the associated field of view 116. For instance, in a particular embodiment, the vision-based sensor(s) 114 may correspond to a stereographic camera(s) having two or more lenses, with a separate image sensor for each lens to allow the camera(s) to capture stereographic or three-dimensional images. However, in alternative embodiments, the vision-based sensor(s) 114 may correspond to a Light Detection and Ranging (LIDAR) sensor(s) configured to capture point cloud data of the field materials within the associated field of view 116.

Figure 4:
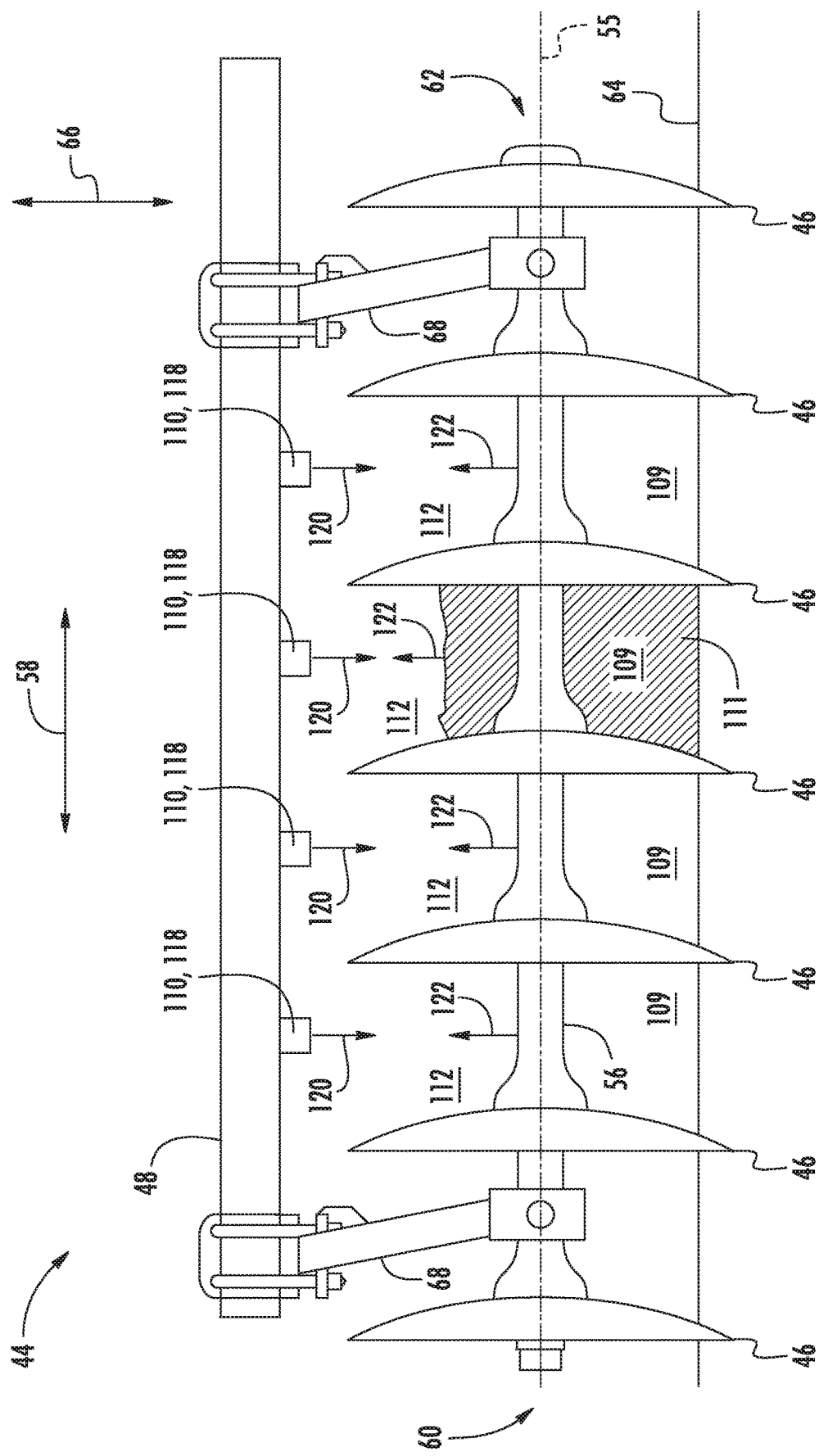
FIG. 4 illustrates a front view of another embodiment of the disc gang of an agricultural implement in accordance with aspects of the present subject matter, particularly illustrating a plurality of beam-based sensors configured to detect field materials within associated detection zones defined between adjacent discs of the disc gang.

Referring now to FIG. 4, a front view of another embodiment of a disc gang 44 is illustrated in accordance with aspects of the present disclosure. As shown in FIG. 4, the disc gang 44 may generally be configured the same as or similar to that described above with reference to FIG. 3. For instance, the disc gang 44 may include a plurality of disc blades 46 rotatably coupled to a disc gang shaft 56, with the blades 46 being spaced apart from each other along an axial direction 58 of the shaft 56. Furthermore, one or more sensors 110 may be provided in operative association with the disc gang 44 and configured to detect field materials within an associated detection zone 112. As described above, each detection zone 112 may be defined directly between a pair of adjacent disc blades 46 in the axial direction 58 and above the disc gang shaft 56 in a vertical direction 66 of the implement 10. However, as shown in FIG. 4, unlike the above-described embodiments, the sensor(s) 110 may be configured as a beam-based sensor(s) 118. As such, each beam-based sensor 118 may be configured to emit one or more output signals (e.g., as indicated by arrows 120 in FIG. 4) for reflection off of the field materials within the associated detection zone 112. The output signals 112 may, in turn, be reflected by the field materials (or off of the disc gang shaft 56 when no field materials are present within the associated detection zone 112) as return signals (e.g., as indicated by arrows 122 in FIG. 4). Moreover, the beam-based sensor(s) 118 may be configured receive the associated reflected return signal(s) 122. For example, in one embodiment, the beam-based sensor(s) 118 may be configured to determine the time-of-flight (TOF) of the associated signals 120, 122, with the TOF being indicative of field materials within the associated detection zone 112. It should be appreciated that the beam-based sensor(s) 118 may generally correspond to any suitable sensing device(s). For example, the beam-based sensor(s) 118 may correspond to an ultrasonic sensor(s) or a radio detection and ranging sensor (RADAR) sensor(s).

Furthermore, it should be appreciated that the sensor(s) 110 may be configured to detect field materials within a detection zone(s) 112 defined between any pair of adjacent rotating ground components on the implement 10. As used herein, a rotating ground engaging component may be any component of the implement 10 configured to rotate relative to the soil as the implement 10 is moved across a field. As such, in one embodiment, the sensor(s) 110 may be configured to detect field materials within detection zone(s) defined between pair(s) of adjacent leveling blades 52. Additionally, in embodiments in which the implement 10 is configured as a seed-planting implement, a sensor 110 may be configured to detect field materials within a detection zone defined between a pair of adjacent closing discs or pinch wheels.

Figure 5:
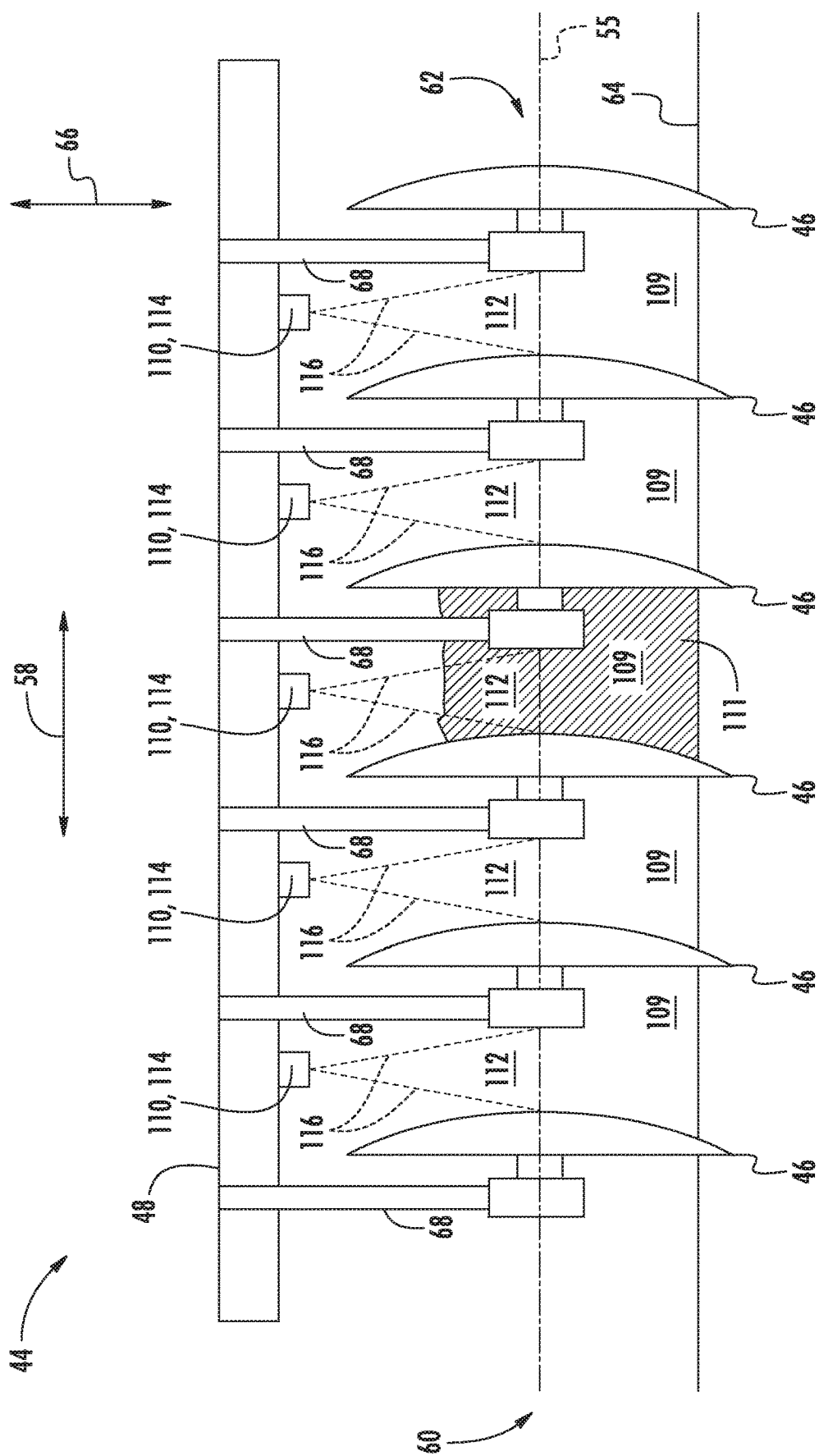
FIG. 5 illustrates a front view of a further embodiment of the disc gang of an agricultural implement in accordance with aspects of the present subject matter, particularly illustrating a plurality of discs individually mounted to a support arm of the disc gang.

Referring now to FIG. 5, a front view of a further embodiment of a disc gang 44 is illustrated in accordance with aspects of the present disclosure. As shown in FIG. 5, the disc gang 44 may generally be configured the same as or similar to that described above with reference to FIGS. 3 and 4. For instance, the disc gang 44 may include a plurality of disc blades 46 spaced apart from each other along an axial direction 58. Furthermore, one or more sensors 110 (e.g., one or more vision-based sensor 114) may be provided in operative association with the disc gang 44 and configured to detect field materials within an associated detection zone 112. As described above, each detection zone 112 may be defined directly between a pair of adjacent disc blades 46 in the axial direction 58. However, as shown in FIG. 5, unlike the above-described embodiments, the disc blades 46 are individually coupled to a support arm 48 of the disc gang 44 by an associated hanger 68. In such embodiment, the disc gang. 44 does not include the disc gang shaft 46. As such, each detection zone 112 may be defined above the axis of rotation 55 of the disc blades 46 in a vertical direction 66 of the implement 10.

Additionally, it should be appreciated that the configuration of the implement 10 described above and shown in FIGS. 1-5 is provided only to place the present subject matter in an exemplary field of use. Thus, it should be appreciated that the present subject matter may be readily adaptable to any manner of implement configuration.

Figure 6:
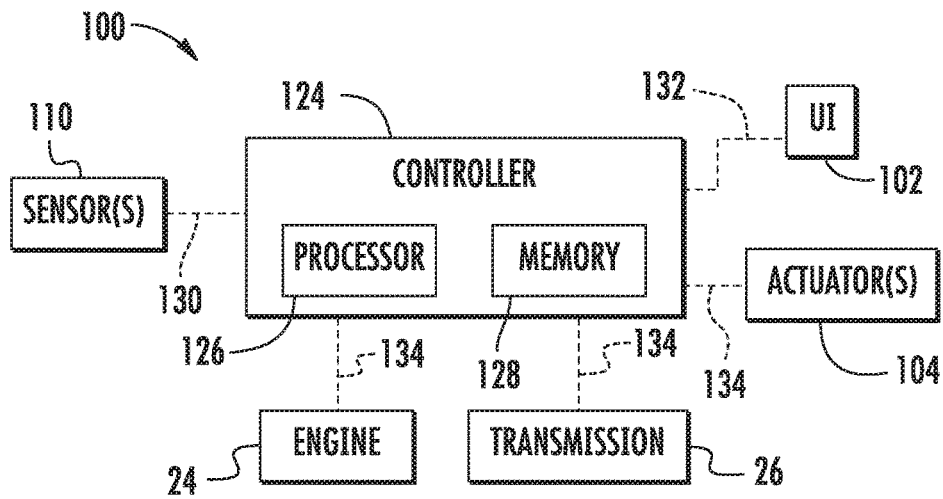
FIG. 6 illustrates a schematic view of one embodiment of a system for detecting accumulations of field materials between ground engaging components of an agricultural implement in accordance with aspects of the present subject matter.

Referring now to FIG. 6, a perspective view of one embodiment of a system 100 for detecting accumulations of field materials between ground engaging components of an agricultural implement is illustrated in accordance with aspects of the present subject matter. In general, the system 100 will be described herein with reference to the implement 10 and the work vehicle 12 described above with reference to FIGS. 1-4. However, it should be appreciated by those of ordinary skill in the art that the disclosed system 100 may generally be utilized with agricultural implements having any other suitable implement configuration and/or work vehicles having any other suitable vehicle configuration.

As shown in FIG. 6, the system 100 may include a controller 124 configured to electronically control the operation of one or more components of the implement 10 and/or the work vehicle 12. In general, the controller 124 may comprise any suitable processor-based device known in the art, such as a computing device or any suitable combination of computing devices. Thus, in several embodiments, the controller 124 may include one or more processor(s) 126 and associated memory device(s) 128 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 128 of the controller 124 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 128 may generally be configured to store suitable computer-readable instructions that, when implemented by the processor(s) 126, configure the controller 124 to perform various computer-implemented functions, such as one or more aspects of the method 200 described below with reference to FIG. 7. In addition, the controller 124 may also include various other suitable components, such as a communications circuit or module, one or more input/output channels, a data/control bus and/or the like.

It should be appreciated that the controller 124 may correspond to an existing controller of the implement 10 or the work vehicle 12 or the controller 124 may correspond to a separate processing device. For instance, in one embodiment, the controller 124 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

Furthermore, in one embodiment, the system 100 may also include the user interface 102. More specifically, the user interface 102 may be configured to provide feedback (e.g., notifications associated with plugging of the rotating ground engaging components of the implement 10) to the operator of the implement 10. As such, the user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the cab 22 of the work vehicle 12. However, in alternative embodiments, the user interface 102 may have any suitable configuration and/or be positioned in any other suitable location.

In several embodiments, the controller 124 may be configured to determine one or more parameters associated with the accumulation of field materials between a plurality of ground engaging components of the implement 10. In general, the ground engaging components may correspond to any suitable components of the implement 10 that are configured to rotate relative to the soil as the implement 10 is moved across the field. For example, in one embodiment, the ground engaging components may correspond to a plurality of the disc blades 46. As such, the controller 124 may be communicatively coupled to one or more of the sensors 110 via wired or wireless connection to allow sensor data (e.g., as indicated by dashed line 130 in FIG. 6) to be transmitted from the sensor(s) 110 to the controller 124. In this regard, the controller 124 may be configured to determine or estimate one or more parameters associated with the accumulation of field materials between one or more pairs of adjacent disc blades 46 (i.e., within the associated flow zone(s) 109) based on the received sensor data 130. For instance, the controller 124 may include a look-up table, suitable mathematical formula, and/or algorithms stored within its memory 128 that correlates the received sensor data 130 to the parameter(s).

It should be appreciated that the determined accumulation parameter(s) may correspond to any suitable parameter(s) associated with the accumulation of field materials between the ground engaging components. As indicated above, the frequency with which field materials are detected within the detection zone(s) 112 may increase when field materials begin to accumulate within the corresponding flow zone(s) 109. As such, in one embodiment, the accumulation parameter(s) may correspond to the frequency at which the field materials are detected within the detection zone(s) 112, such as the number of times during a given time period that field materials are detected within the detection zone(s) 112. Moreover, as indicated above, time period across which field materials are detected within the detection zone(s) 112 may increase when field materials begin to accumulate within the corresponding flow zone(s) 109. As such, in another embodiment, the accumulation parameter(s) may correspond to the period of time across which the field materials are detected within the detection zone(s) 112, such as the total time period across which field materials are continuously detected within the detection zone(s) 112. Additionally, as indicated above, when the flow zone(s) 109 are completely plugged, the field materials may continuously flow through such flow zone(s) 109. As such, in a further embodiment, the accumulation parameter(s) may correspond to the amount of the field materials detected within the detection zone(s) 112, such as a portion or percentage of the detection zone(s) 112 in which the field materials are detected.

Furthermore, the controller 124 may be configured to monitor the determined plugging parameter(s) and initiate one or more control actions when the plugging parameter(s) exceeds or falls below a threshold value(s). Specifically, in several embodiments, the controller 124 may be configured to compare the values associated with the monitored plugging parameter(s) to an associated threshold value. For example, in one embodiment, the controller 124 may be configured to compare the values associated with the frequency at which the field materials are detected within the detection zone(s) 112 to a maximum frequency value. In another embodiment, the controller 124 may be configured to compare the values associated with the period of time across which the field materials are detected within the detection zone(s) 112 to a maximum time period value. In a further embodiment, the controller 124 may be configured to compare the values associated with the amount of the field materials detected within the detection zone(s) 112 to a maximum amount value. Thereafter, in the event that the value(s) of the monitored plugging parameter(s) exceeds or falls below the associated threshold value (thereby indicating that the associated ground engaging components may be plugged with the field materials), the controller 124 may be configured to initiate one or more control actions.

In one embodiment, when the value(s) of the monitored accumulation parameter(s) exceeds or falls below the associated threshold value, the controller 124 may be configured to notify the operator of implement 10 that field materials have accumulated between the ground engaging tools. Specifically, in one embodiment, the controller 124 may be communicatively coupled to the user interface 102 via a wired or wireless connection to allow feedback signals (e.g., indicated by dashed line 132 in FIG. 6) to be transmitted from the controller 124 to the user interface 102. In such embodiment, the feedback signals 132 may instruct the user interface 102 to provide a notification to the operator of the implement 10 (e.g., by causing a visual or audible notification or indicator to be presented to the operator) that provides an indication that field have accumulated between the ground engaging tools of the implement 10. In such instances, the operator may then choose to initiate any suitable corrective action he/she believes is necessary, such as adjusting one or more operating parameters of the implement 10 and/or the work vehicle 12.

Moreover, in several embodiments, the controller 124 may be configured to automatically adjust one or more operating parameters of the implement 10 when it is determined that the value(s) of the monitored accumulation parameter(s) exceeds or falls below the associated threshold value. Specifically, as shown in FIG. 6, the controller 124 may be communicatively coupled to the disc gang actuator(s) 104 of the implement 10 via a wired or wireless connection to allow control signals (e.g., as indicated by dashed lines 134 in FIG. 6) to be transmitted from the controller 124 to the actuator(s) 104. As such, the controller 124 may be configured to transmit control signals 134 to the actuator(s) 104 instructing the actuator(s) 104 to adjust the angle of the disc gang(s) 44 relative to the lateral centerline of the implement frame 28 and/or the penetration depth of the associated disc blade(s) 46.

Furthermore, in one embodiment, the controller 124 may be configured to automatically adjust the ground speed at which the work vehicle 12 is towing the implement 10 across the field when it is determined that the value(s) of the monitored plugging parameter(s) exceeds or falls below the associated threshold value. Specifically, the controller 124 may be communicatively coupled to the engine 24 and/or the transmission 26 of the work vehicle 12 via a wired or wireless connection to allow control signals 134 to be transmitted from the controller 124 to the engine 24 and/or the transmission 26. For example, the control signals 128 may be configured to instruct the engine 24 to vary its power output to increase or decrease the ground speed of the work vehicle 12 in a manner that removes the accumulated field materials from the ground engaging tools and/or prevents further accumulation of such materials. Similarly, the control signals 128 may be configured to instruct the transmission 26 to upshift or downshift to change the ground speed of the work vehicle 12 in a manner that removes the accumulated field materials from the ground engaging tools and/or prevents further accumulation of such materials. However, it should be appreciated that, in alternative embodiments, the controller 124 may be configured to transmit control signals to any other suitable component of the work vehicle 12 and/or implement 10 such that the ground speed of the work vehicle 12 and/or implement 10 is adjusted.

Figure 7:
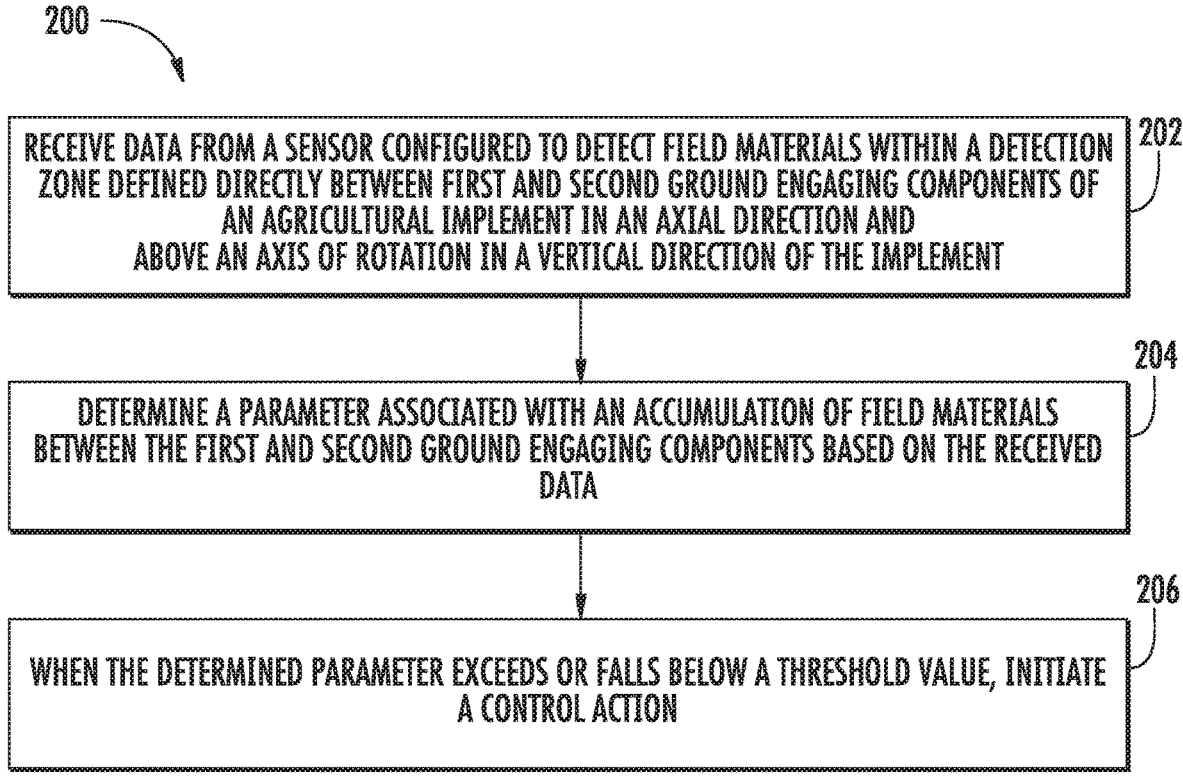
FIG. 7 illustrates a flow diagram of one embodiment of a method for detecting accumulations of field materials ground engaging components of an agricultural implement in accordance with aspects of the present subject matter.

Referring now to FIG. 7, a flow diagram of one embodiment of a method 200 for detecting accumulations of field materials between ground engaging components of an agricultural implement is illustrated in accordance with aspects of the present subject matter. In general, the method 200 will be described herein with reference to the agricultural implement 10, the work vehicle 12, and the system 100 described above with reference to FIGS. 1-6. However, it should be appreciated by those of ordinary skill in the art that the disclosed method 200 may generally be implemented with any agricultural implement having any suitable implement configuration, any work vehicle having any suitable vehicle configuration, and/or any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving, with a computing device, data from a sensor configured to detect field materials within a detection zone defined directly between first and second ground engaging components of an agricultural implement in an axial direction and above the an axis of rotation in a vertical direction of the implement. For instance, as described above, the controller 124 may be communicatively coupled to one or more sensors 110 provided in operative association with one or more ground engaging tools of the implement 10, such as the disc blade(s) 46. As such, when the implement 10 is being towed across the field by the work vehicle 12, the controller 124 may be configured to receive sensor data 130 from the sensor(s) 110.

Additionally, at (204), the method 200 may include determining, with the computing device, a parameter associated with an accumulation of field materials between the first and second ground engaging components based on the received data. For instance, as described above, the controller 124 may be configured to determine or estimate one or more parameters associated with accumulation of field materials between the disc blades 46 based on sensor data 130 received from the sensor(s) 110. Such accumulation parameter(s) may include the amount of the field materials detected within an associated detection zone 112, the frequency at which the field materials are detected within the associated detection zone 112, and/or the period of time across which the field materials detected within the detection zone 112.

Moreover, as shown in FIG. 7, at (206), when the determined parameter exceeds or falls below a threshold value, the method 200 may include initiating, with the computing device, a control action. For instance, as described above, the controller 124 may be communicatively coupled to the disc gang actuator(s) 104 of the implement 10, the engine 24 of the work vehicle 12, and/or the transmission 26 of the work vehicle 12. As such, when the determined accumulation parameter(s) exceeds or falls below the associated threshold value, the controller 124 may be configured to transmit control signals 134 to the actuator(s) 104, the engine 24, and/or the transmission 26 instructing such devices to adjust one or more operating parameters of the implement 10. For example, such operating parameters may include the angle of the disc gang(s) 44 relative to the lateral centerline of the implement frame 28, the penetration depth of the disc blade(s) 46, and/or the ground speed of the implement 10.

It is to be understood that the steps of the method 200 are performed by the controller 124 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 124 described herein, such as the method 200, is implemented in software code or instructions which are tangibly stored on a tangible computer readable medium. The controller 124 loads the software code or instructions via a direct interface with the computer readable medium or via a wired and/or wireless network. Upon loading and executing such software code or instructions by the controller 124, the controller 124 may perform any of the functionality of the controller 124 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting accumulations of field materials between ground engaging components of an agricultural implement, the system comprising:
    first and second ground engaging components configured to rotate about an axis of rotation relative to soil within a field as the agricultural implement is moved across the field, the first and second ground engaging components being spaced apart from each other along an axial direction corresponding to the axis of rotation;
    a sensor configured to detect field materials within a detection zone defined directly between the first and second ground engaging components in the axial direction and above the axis of rotation in a vertical direction of the agricultural implement; and
    a controller communicatively coupled to the sensor, the controller configured to determine a parameter associated with an accumulation of the field materials within a flow zone defined directly between the first and second ground engaging components in the axial direction and below the axis of rotation in the vertical direction based on data received from the sensor.

2. The system of claim 1, further comprising:
    a shaft, the first and second ground engaging components being coupled to the shaft, the detection zone being defined above the shaft in the vertical direction, the flow zone being defined below the shaft in the vertical direction.

3. The system of claim 1, wherein the parameter is an amount of the field materials detected within the detection zone.

4. The system of claim 1, wherein the parameter is a frequency at which the field materials are detected within the detection zone.

5. The system of claim 1, wherein the parameter is a period of time across which the field materials are detected within the detection zone.

6. The system of claim 1, wherein the controller is further configured to monitor the determined parameter relative to a threshold value and initiate a control action associated with removing the accumulation of field materials when the monitored parameter exceeds or falls below the threshold value.

7. The system of claim 6, wherein the control action comprises notifying an operator of the agricultural implement that the field materials have accumulated between the first and second ground engaging components.

8. The system of claim 6, wherein the control action comprises adjusting an operating parameter of the agricultural implement.

9. The system of claim 8, wherein the operating parameter comprises at least one of a downforce applied to or a penetration depth of the first and second ground engaging components.

10. The system of claim 1, wherein the first and second ground engaging components comprise first and second discs, respectively.

11. The system of claim 1, wherein the sensor corresponds to one of a vision-based sensor, a RADAR sensor, or an ultrasonic sensor.

12. A tillage implement, comprising:
a frame;
a shaft coupled to the frame, the shaft being positioned below the frame along a vertical direction of the tillage implement;
first and second discs configured to rotate relative to soil within a field as the tillage implement is moved across the field, the first and second ground engaging components being coupled to the shaft and spaced apart from each other along an axial direction of the shaft;
a sensor mounted on the frame and configured to detect field materials within a detection zone defined directly between the first and second ground engaging components in the axial direction and above the shaft in the vertical direction; and
a controller communicatively coupled to the sensor, the controller configured to determine a parameter associated with an accumulation of the field materials within a flow zone defined directly between the first and second ground engaging components in the axial direction and below the shaft in the vertical direction based on data received from the sensor.

13. A method for detecting accumulations of field materials between ground engaging components of an agricultural implement, the agricultural implement comprising first and second ground engaging components configured to rotate about an axis of rotation relative to soil within a field as the agricultural implement is moved across the field, the first and second ground engaging components being spaced apart from each other along an axial direction corresponding to the axis of rotation, the method comprising:
receiving, with a computing device, data from a sensor configured to detect field materials within a detection zone defined directly between the first and second ground engaging components in the axial direction and above the axis of rotation in a vertical direction of the agricultural implement;
determining, with the computing device, a parameter associated with an accumulation of the field materials within a flow zone defined directly between the first and second ground engaging components in the axial direction and below the axis of rotation in the vertical direction based on the received data; and
when the determined parameter exceeds or falls below a threshold value, initiating, with the computing device, a control action associated with removing the accumulation of field materials.

14. The method of claim 13, wherein the first and second ground engaging components are coupled to a shaft, the detection zone being defined above the shaft in the vertical direction, the flow zone being defined below the shaft in the vertical direction.

15. The method of claim 13, wherein the parameter is an amount of the field materials detected within the detection zone.

16. The method of claim 13, wherein the parameter is a frequency at which the field materials are detected within the detection zone.

17. The method of claim 13, wherein the parameter is a period of time across which the field materials are detected within the detection zone.

18. The method of claim 13, wherein the control action comprises notifying an operator of the agricultural implement that the field materials have accumulated between the first and second ground engaging components.

19. The method of claim 13, wherein the control action comprises adjusting an operating parameter of the agricultural implement.

* * * * *